United States Patent Office 3,146,168
Patented Aug. 25, 1964

3,146,168
MANUFACTURE OF PHARMACEUTICAL PREPARATIONS CONTAINING CELLULOSE CRYSTALLITE AGGREGATES
Orlando A. Battista, Drexel Hill, Pa., assignor, by mesne assignments, to FMC Corporation, San Jose, Calif., a corporation of Delaware
No Drawing. Filed Apr. 10, 1962, Ser. No. 186,348
9 Claims. (Cl. 167—82)

This invention relates to the manufacture of pharmaceutical preparations of improved product form having cellulose crystallite aggregates or certain derivatives of cellulose crystallite aggregates present therein. The preparations, or product forms, aside from the presence of the crystallite aggregates or aggregates derivatives, generally comprise those in current use, for which the aggregates and aggregates derivatives provide a number of useful advantages, depending on the preparation.

By virtue of their unique properties, the crystallite aggregates and their derivatives are capable of improving a wide range of pharmaceutical product forms. In particular, the aggregates and their derivatives possess the highly useful property of forming stable homogeneous colloidal gels and dispersions which when mixed with pharmaceutical ingredients, form stable homogeneous pharmaceutical products, including suspensions, dispersions, lotions, creams, ointments, pastes, and the like. The aggregates and their derivatives have a substantial affinity or sorptive power for oily, fatty, and waxy materials, and also for water and other aqueous fluids, and, therefore, are of value in binding and stabilizing these and other ingredients of a preparation; or if desired, they may form, with the foregoing materials, apparently dry, free-flowing mixtures which may be useful per se as well as in other product formulations. Particularly in view of the last-mentioned property, and the fact that the aggregates and derivatives are compressible, a quality that is imparted to mixtures containing them, they are of particular value for making tablets and pills, wherein their anti-caking characteristic helps make these dosage forms resistant to humid atmospheres. The aggregates are available in a high state or purity, comprising as they do, one of the purest forms of cellulose, and are entirely safe to eat. When used in a preparation for application to the skin, they are not likely to cause undesirable dermatological reactions. The aggregates have a smooth texture, being obtainable in the form of impalpable powders; are substantially opaque; are characterized by exhibiting very good color and flavor retention; and have a variable, and controllable, particle size ranging from below 1 micron to 250 to 300 microns.

Cellulose crystallite aggregates are small disintegrated aggregates of level-off D.P. cellulose. These small disintegrated aggregates, their properties and a method of disintegrating the level-off D.P. cellulose are described in United States Patent 2,978,446, issued April 4, 1961. They are acid-insoluble products produced by the controlled acid hydrolysis of cellulose and the level-off D.P. value reflects a destruction of the original fibrous structure of the cellulosic source material. The term "level-off D.P." has reference to the average level-off degree of polymerization of the cellulose product measured in accordance with the paper by O. A. Battista, entitled "Hydrolysis and Crystallization of Cellulose," vol 42, Industrial and Engineering Chemistry, pages 502–7 (1950).

The source material for the cellulose crystallite aggregates may be of any of the neutral cellulose materials, such as natural fibers, for example, ramie, cotton, purified cotton, purified wood pulps such as bleached sulfite pulp, bleached sulfate pulp, etc., or regenerated forms of cellulose, for example, rayon, cellophane, etc., and in all instances has an actual D.P. greater than its average level-off D.P. The aggregates may have an average level-off D.P. value in the range of from about 15 to about 375 and the specific value will be dependent upon the source material. Aggregates having an average level-off D.P. in the range of 15 to 60, for example, are produced from regenerated forms of cellulose. Aggregates having an average level-off D.P. in the range of 60 to 125 may be obtained from alkali swollen natural forms of cellulose such as cotton linters and purified wood pulps. Sulfite pulp as a source material will produce cellulose crystallite aggregates having an average level-off D.P. in the range of 200 to 300. Although the cellulose chains in the crystallites are uniform in length by comparison with the source material, some variation occurs, and, for this reason, the D.P. is referred to as an average level-off D.P. value.

In accordance with recognized principles of polymer chemistry, in speaking of degree of polymerization (D.P.), reference is made to the pure polymer. It is to be understood that the stated level-off D.P. values of the cellulose has reference to substantially pure cellulose such as cellulose crystallites derived from highly purified cellulose sources including regenerated forms of cellulose. Where a crude or raw wood pulp is subjected to a hydrolysis treatment for the production of the level-off D.P. cellulose crystallites, appreciable amounts of lignin and other non-cellulose materials will be present in the residue and measurements of average level-off D.P. of such residue may exhibit apparent values as high as 500. Such high values reflect the presence of lignin and other non-cellulose material and are not true values of the level-off D.P. of the cellulose per se. However, there is present in the mass some cellulose which has been reduced to the average level-off D.P.

Associated with the level-off D.P. properties of the crystallite aggregates is the known fact that their chemical purity is very high and these aggregates constitute perhaps the purest form of cellulose. For example, the ash content ranges from about 10 to 600 p.p.m. whereas conventional fibrous cellulose will have an ash content of from 1000 to 4000 p.p.m.

It is well known that the various forms of cellulose, such as cotton and wood pulps, contain non-cellulosic components including plant steroids which steroids are believed to be chemically bound to the cellulose and thus are in a physiologically inert state. For example, purified wood pulps commonly termed high alpha pulps contain from about 1000 p.p.m. to about 3000 p.p.m. ether extractable components including plant steroids which cannot be assimilated by the human system. Acid hydrolysis in disrupting the fine structure of the cellulose may make the plant steroids more available for physiological assimilation. Cellulose crystallite aggregates, for example, formed from a refined wood pulp (93% alpha cellulose, 1000 p.p.m. ether extractable components) will contain about 800 p.p.m. of the ether extractable components. For certain preferred purposes of the present invention, the ether extractable component content (including the steroids) may be from about 50 p.p.m. and should not exceed 500 p.p.m., preferably not exceeding about 200 p.p.m. Cellulose crystallite aggregates formed from high alpha cellulose and, for example, containing 800 p.p.m. of ether extractable components may be subjected to hot isopropanol extractions to reduce the extractable component content to less than 200 p.p.m. Special pulps of a dissolving type are commercially available containing less than 500 p.p.m. of ether extractable components including plant steroids and obviously the cellulose crystallite aggregates formed from such cellulose sources will have the desired low ether extractable component content.

In the production of the cellulose crystallite aggregates, they are washed with water after hydrolysis of the source material and the particle size of the individual aggregates will vary from about one micron to about 300 microns as determined by visual microscopic examination. These aggregates may be disintegrated to form products having a particle size less than one micron to about 300 microns and the particle size and the particle size distribution may be varied depending upon the specific disintegrating method and the period during which the aggregates are subjected to disintegration.

The preferred disintegration method is to attrite the aggregates, that is, subject the aggregates to a rubbing or shearing action, by means of a high speed cutting action in the presence of an aqueous medium. It is preferred that the water content of the mixture undergoing attrition should be at least about 15% to 25% by weight. The aggregates content of the mixture to be attrited is at least 3% by weight and, desirably, is higher as the efficiency of the cutting action increases with the aggregates content. For example, attrition at a 3% consistency so as to provide at least 1% of a particle size less than one micron will produce a milky dispersion. The relative viscosity or thickness of the dispersion varies with the relative proportion of particles of a size less than one micron. Prolonging attrition will increase the amount of fine particles and, accordingly, increase the viscosity to some extent. The stability of the dispersions increase with an increase in the pH of the medium. At pH's between substantially neutral and 11, the dispersions remain stable indefinitely.

Either before or after mechanical disintegration, the aggregates may be dried. For some purposes, it is preferable to de-water rather than dry the material because the never-dried cellulose crystallite aggregates form dispersions more readily and the dispersions have a smoother texture when prepared from a never-dried material. The aggregates may be dried and recovered in particulate form, for example, by freeze drying, spray drying, drum drying, vacuum drying and drying by solvent displacement.

A particularly unique and distinguishing characteristic of the disintegrated aggregates is that a stable dispersion of the aggregates in an aqueous medium, where the aggregates constitute about 1% by weight of the dispersion and at least 1% of the weight of the dispersed aggregates have a particle size of up to one micron, when applied to glass and the water allowed to evaporate forms an extremely adherent film on the glass.

Derivatives of cellulose crystallite aggregates, herein designated as aggregates derivatives, are essentially topochemical derivatives of the cellulose crystallite aggregates and possess physcal characteristics and properties similar to those of cellulose crystallite aggregates. For example, the derivatives have about the same D.P., a size in the same particle size range as the crystallite aggregates from which they have been formed and similar dispersibility and gel-forming characteristics. Chemically, the degree of substitution (D.S.) is at least 0.01 but in all cases is sufficiently low so that the derivatives are water-insoluble and/or organic solvent-insoluble. The unique and distinguishing characteristic of the disintegrated derivatives like that of the disintegrated crystallite aggregates is their ability to form stable dispersions in liquid media where the derivatives constitute at least about 1% by weight of the dispersion and at least 1% of the weight of the dispersed aggregates derivatives have a particle size not exceeding about 1 micron.

Oxidation derivatives containing one or more carbonyl linkages including aldehyde, carboxyl and mixed aldehyde-carboxyl derivatives of the cellulose crystallite aggregates as disclosed in the copending application Serial No. 2133, filed January 13, 1960, now Patent No. 3,111,513, dated November 19, 1963, and having the characteristics as described are satisfactory for the purposes of this invention. Similarly, ether derivatives as described in copending application Serial No. 2134, filed January 13, 1960, are also satisfactory. These derivatives are characterized by having one or more —OR groups where R may be an aliphatic or substituted aliphatic radical, either a straight or branched chain containing from 1 to 12 or more carbon atoms, an aryl or aralkyl or substituted aralkyl radical or a carboxyalkyl, hydroxyalkyl, cyanoalkyl, alkoxyalkyl, aralkyloxyalkyl, or a dialkylaminoalkyl radical. Ester derivatives as described in copending application Serial No. 2135, filed January 13, 1960, are also satisfactory and include esters of inorganic acids such as the nitrates, nitrites, thiocyanates and phosphates and esters of organic acids such as the formates, acetates, propionates, butyrates, mixed acetate-propionates, mixed acetate-butyrates, other aliphatic acid derivatives containing up to 18 or more carbon atoms and aryl or aralkyl esters such as, for example, benzoates, phenyl acetate esters, phthalate esters, naphthonates and the like.

For the purposes of the present invention, the cellulose crystallite aggregates and the aggregates derivatives having physical characteristics and properties similar to those of the cellulose crystallite aggregates are equivalents and in the succeeding discussion and in the claims, the terms "cellulose crystallite aggregates" and "aggregates" are to be understood as designating and are used to designate both the cellulose crystallite aggregates and the aggregates derivatives.

For the purposes of the invention, a dispersion may be defined as having about 1 to 8% by weight of the aggregate dispersed in the aqueous or other liquid, the latter constituting the continuous phase of the mixture. The dispersion has the physical form or appearance of a liquid, and is flowable like a liquid. A gel may be defined as having about 3 to 35% by weight of aggregates dispersed in the aqueous or other liquid. The gel has the physical form of a jelly, paste, plastic mass or the like. As noted, both dispersions and gels are included by the term suspension.

In general, the aggregates are preferably attrited before being used to make up a product form, except that where apparently dry, granular free-flowing mixtures are made for use per se, the aggregates are preferably non-attrited. Wherever the gel or dispersion form of the aggregates is to be employed, they are first attrited, and this is preferably the case for products like troches and lozenges which are held in the mouth for an extended period. In some instances, as in the manufacture of tablets, pills, capsules, dry powders, etc., the aggregates need not necessarily be attrited, particularly if they have been dried as by spray drying, although in general, attrited aggregates are preferred in these instances. It will be apparent that in the case of water-containing preparations, the aggregates may be initially in the form of wet gels which may serve to provide the water content of the preparation as well as to aid in obtaining a well-mixed product. For dry preparations the aggregates may be employed in dry form, and the same is true where they are to be used in non-aqueous oleaginous preparations. For the latter, the aggregates may advantageously be premixed with the oleaginous material to form an apparently dry free-flowing crumb, thus facilitating the formulation of the product.

A variety of pharmaceutical product forms may be benefited by the addition of the aggregates, although as the aggregates are water- and oil-insoluble, their use is limited to preparations at least partly composed of solid materials. The term pharmaceutical is intended to refer to drugs as defined in the United States Federal Food, Drug, and Cosmetic Act.

Considering the application of the aggregates to specific pharmaceutical product forms, they are of particular value in the manufacture of tablets by the high-pressure compression of dry granular mixes, or granulations, which generally comprise one or more active ingredients, fillers, disintegrators, lubricants, binders, and if desired, colors. The excellent compressibility of the aggregates, especially in the dry state, to give a coherent form-retaining shape or structure, qualifies them to be used in place of conventional fillers like starch and sugar or conventional binding agents like gelatin, corn syrup, and various gums. By comparison with starch, the aggregates are very considerably superior in compressibility and cohesive power after compression, as demonstrated by the substantially dust-free character of the tablets after being shaken for a period of time. In this respect, starch-containing tablets erode easily, forming a dust which collects on the sides and bottom of bottles in which they are sold or dispensed. In many instances the aggregates may be substituted for two or more of the auxiliary components of a tablet; thus, they are not only capable of replacing the conventional filler and/or binder, but also the lubricant and disintegrator; and this is particularly true of aggregates of finer particle size, say below 100 or below 50 microns. In dry form, the aggregates have noticeable lubricity and may function as their own lubricant. As the aggregates are water dispersible, a tablet formed from them will disintegrate completely in water within a few minutes, and if gentle mechanical agitation is employed they are capable of falling apart in one or two minutes. The rate of disintegration will of course depend on the amount of aggregates used in a tablet formulation and also on the compression pressure; thus lower amounts and lower pressures will favor faster rates of disintegration, and vice versa. It is feasible in this connection to obtain varying rates by simply varying the aggregates concentration and the tablet-forming pressure.

Owing to the fact that in tablet compressing machines the granular charge, or granulation, from which each tablet is made, is measured by volume rather than by weight, it is necessary that the machines should be supplied continuously with uniform and free-flowing granulations. This is a requirement that must be met for any given tablet formulation, a truly formidable task when one considers the wide variety of tablet ingredients that are in use. By virtue of their free flowing quality, availability in uniform particle sizes, non-caking characteristics, and compressibility in the dry state, the crystallite aggregates provide substantial advantages when incorporated in granulations. More specifically, the aggregates are not only free-flowing per se but can impart this property to mixtures in which they are present. A wider range of tablet ingredients is thus made possible, including ingredients that are oleaginous or syrupy in character inasmuch as they may be converted into apparently dry, freely flowable, granular mixtures by admixture with the aggregates. One consequence of advantage is the accuracy and convenience of measuring and weighing granular mixtures rather than syrupy, oily materials. In respect of their uniform particle size, it is pertinent to note that fractions of aggregates are obtainable which entirely pass through screens as low as 400 mesh (about 37 microns), as well as through screens of any greater practical mesh sizes. Even finer particle sizes are possible, of the order of 1 or 2 microns, and in some cases as low as 0.1 micron. Also, these uniformly-sized fractions or batches may each have a uniform bulk density, which in practice may vary from about 7 to about 34 pounds per cubic foot. Being thus flexible, the aggregates can provide tablets of varying size and density. In respect of their non-caking property, the aggregates have the capacity of sorbing moisture, that is, both adsorbing and absorbing it, and by thus binding it they protect the other tablet ingredients which may be sensitive to moisture. In these respects the aggregates are superior to starch. For example, under conditions of increasing humidity, going up, say, to 95% relative humidity, starch becomes tacky and sticky whereas the aggregates do not.

Under generally prevailing conditions of preparation, storage, and use of tablets, it may be noted that the aggregates are chemically inert to other conventional tablet ingredients, including the active components.

Because of the foregoing properties, and especially because of their compressibility, the aggregates enable many tablet granulations to be produced by the so-called direct method, that is, granulations comprising materials which naturally possess good tablet-making properties without further treatment. Furthermore, use of the aggregates may reduce the number of granulations required to be prepared by the detailed wet method, wherein wetting and drying steps are employed to get the granulations in proper condition; in particular, the wet method comprises (a) mixing the active ingredient and filler, usually starch, and either with or without a color, (b) milling these ingredients either during the mixing step or subsequently thereto, (c) wet-mixing the milled mixture with an aqueous solution of a binding agent; (d) screening the wet mixture to obtain particles of the desired size, (e) drying the wet particles, (f) screening the dried particles to obtain a granulation of uniform size suitable for the compressing machine, (g) then blending the granulation with other ingredients which for one reason or another (heat sensitivity, instability, etc.) could not be included previously, such as the lubricant or disintegrating agent, and (h) charging the mixture to the compressing machine. Owing to their sorptive effect on various ingredients, and their compressibility in the dry state, the aggregates may make the wet method an unnecessary one to use, particularly the use of the wet binder. However, where a wet-mixing step must be done, or is preferred for one reason or another, such a step may be accomplished by employing a wet aggregates gel. All of the other ingredients may be blended with this wet gel and the over-all mixture spray dried or drum dried at an appropriate temperature to form a dry mix suitable for being fed to the compressing machine.

In many cases the aggregates permit the dry preparation of granulations, a method used where moisture or heat would be detrimental. In this method a portion of the solid ingredients are compressed at high pressure to form large tablets or slugs, and these are then broken down or comminuted, blended with other desired ingredients, and the resulting mix charged to the compressing machine. The good compressibility of the aggregates makes them advantageous for use in the practice of this method.

The aggregates are of value for coating tablets, particularly in the step of applying the first or subcoat, which may comprise a mixture of syrup and aggregates. For the final or polishing coating, a mixture of wax and the aggregates may be suitable. If desired, the aggregates may replace syrup, sugar, etc. in the intermediate coats.

Effervescent tablets, comprising citric or tartaric acids and an alkali bicarbonate, may usefully incorporate the aggregates for protection against the introduction of moisture which otherwise would deteriorate them. The aggregates may not only bind the moisture, as noted, but permit the tablet granulations to be compressed more tightly and thus make the tablets more impervious to moisture.

Pills comprise a mixture of an active ingredient and an excipient, which is usually a gummy or syrup material such as sugar syrup, acacia syrup, glycerol, or even water, and which keeps the mixture in more or less plastic form. The mixture is worked thoroughly by means of rolling and kneading equipment, then subjected to extrusion, cut, and thereafter formed into small balls or pills. Hardening of the pills is to be avoided as this decreases their solubility. Extensive working of the mixture may be reduced, or performed with less expensive equipment, by blending the active ingredient with an aqueous aggregates gel of high solids content, or with an aggregates-water mixture containing, say, 35 to 75% by weight of aggregates. Suitably, the blending can be done at the time of preparing the aggregates gel or aggregates-water mixture.

In the case of gelatin capsules adapted to receive accurate doses of dry powder medication, the dry powder may, if desired, be formed into coherent masses of approximately capsule size by blending and pressing with the aggregates, thus avoiding the necessity of handling dry powders in connection with the filling and cleaning of the capsules. The pressed capsule charge may then be placed as one piece in the capsules and may provide a more positive flow through the hoppers of the capsule filling equipment.

Ointment or semi-solid preparations for external use usually comprise an active ingredient and an oleaginous base which may be lard, petrolatum, lanolin, etc. If a water soluble base is used, the product is generally called a cream. The aggregates are of value in these preparations wherever less greasy products are desired and may serve to replace at least a portion of the oleaginous base. An advantage of replacing one or more oleaginous components, or a part thereof, is that the soiling tendency of the product is reduced, that is to say, after being spread over the skin by the user, the coatings are less apt to pick up or attract soil or foreign particles; similarly, the deposited products transfer off the user's skin less readily, as by contact with clothing, bedsheets, and the like. Having lubricity of their own, the aggregates do not rob the product of lubricity, and additionally may reduce pick-up by the bandage. Gels of aggregates are compatible with oleaginous materials and thus may simplify ointment, paste, and cream manufacture. For example, all the dry ingredients may first be blended into the gel, preferably a high solids gel, and the resulting mix may be blended with the oleaginous ingredients without the necessity of first melting them, especially if a surface-active agent is present. Variations in the stiffness and opacity of the products are possible. In some cases, the aggregates by themselves may constitute the base, or the major portion thereof, for topically applied semi-solid preparations, particularly where a greaseless but unguent product is desired; in other words, the active drug agent may be incorporated in the wet aggregates, either in gel or paste-like form, and the resulting mix used in place of a cream, paste, or ointment.

Owing to their good gel- and dispersion-forming properties, the aggregates are of value for stabilizing suspensions, including dispersions, gels, lotions and other mixtures containing insoluble particles dispersed therein. These suspensions are usually subjected to colloid mills and homogenizers to secure emulsification and homogenization, but despite these steps, some suspensions, particularly on standing, still exhibit clumping of solid particles with the result that the product is non-homogeneous and unattractive. Blending of the suspension ingredients into an aggregates-containing gel or dispersion helps to secure a uniform, stable, homogeneous suspension which is free from clumping and settling. For example, an anti-acid laxative comprising an aqueous suspension of magnesium hydroxide, a suspending agent such as carboxymethyl cellulose, and a flavor (9 to 10% total solids), may be rendered less sediment-forming, and also less chalky to the taste, by the addition of up to 5% by weight of the aggregates, while still keeping the suspension flowable. In other instances, addition of the aggregates to a suspension may increase its stability by helping to balance any difference in density of the various solids present.

The aggregates are of value as a diluent to adjust the concentration of powders and powder extracts, in which application they may advantageously replace sugar and starch in view of their good anti-caking properties. External dusting powders containing an active drug ingredient, may usefully incorporate the aggregates to take advantage of the extremely fine size in which they are available, usually 30 to 50 microns but also going down to 1 or 2 microns or less. They are also available in sizes up to 250 to 300 microns, and, furthermore, in uniformly-sized fractions or batches. The apparent or bulk density may be as low as 7 or 8 lbs./cu. ft., which indicates a very fluffy material, and as high as 34 to 35 lbs./cu. ft. Conventional corn starch has a bulk density of about 36–37 lbs./cu. ft. Besides their fineness of size, the aggregates are further characterized by their appreciable adherence, good slip or rubbability, and good adsorbency. Unlike starch, they do not become doughy in contact with the perspiring skin; and they are not odorous, unlike talc, which is widely used in dusting powders but which has an earthy odor.

In other applications, the aggregates may serve as a binding agent in troches or lozenges to hold together the active ingredients and the flavor; desirably, the aggregates may be in the wet state, either a high solids gel or aggregates-water mixture, when formulating these products to get a smooth mouth feel. In preparations that are apt to be chewed, a small amount, say 0.1 to 5% by weight, of an edible protective colloid may be added to increase the smoothness of the material in the mouth, or to vary its texture; suitable colloids include conventional gums like carrageenin, tragacanth, arabic, ghatti, and karaya gums; seaweed colloids such as agar, carrageen and sodium alginate; seed extracts such as locust bean, quince and guar; starches and starch derivatives, like converted starches; water-dispersible cellulose derivatives such as sodium carboxymethyl cellulose; pectins such as apple pectin and citrus pectin; and the like. In poultices, they may replace paste-forming materials like flour and clay. Vitamin-containing tablets may be formed by blending a gel of the aggregates with a vitamin or vitamin-containing source material, including oil-soluble as well as water-soluble vitamins. Thus, source materials like fish liver oil are suitable, the taste and odor of which may be improved by blending in a desired flavor. Also useful are vitamin B concentrates as derived from soybean oil. An aggregates gel may be blended with the oily source material to give an apparently dry free-flowing mix which is compressible to tablet form; the resulting tablets are redispersible in water by means of a suitable attrition step. If a moisture-free granulation is desired, the free-flowing mix, prior to tableting, may be subjected to drying, particularly spray drying or drum drying, after which it may be tableted. A suitable flavor, e.g., orange, may be added to these granulations during or prior to blending to help lessen the taste of the oily source material.

In any of the foregoing product forms, the drug agent or agents with which the aggregates may be associated is widely variable, and, in view of the inertness of the aggregates, may be any suitable agent, including illustrative agents like analgesics, anti-infectives, anti-acid preparations, anti-ulcer drugs, anti-histamines, hypnotics, sedatives, vitamins, stomachics, local anesthetics, local irritants, astringents, fungicides, local antiseptics, etc.

As indicated, the aggregates are safe enough to be eaten. They have no known toxic local effects. They have a bland taste and odor, a white color, and physically resemble starch. Being a form of cellulose, they have therapeutic value as a safe wholesome laxative. It is considered that the aggregates may have the effect of a protective colloid in the gastro-intestinal tract, from which they are not absorbed but rather pass through substantially unchanged.

Not the least of the characteristics of the aggregates is their removability from the skin by the application of water, regardless of the preparation in which they are used. While they are not soluble in water, they are dispersible in it and are readily washed off the skin.

In general, too, any preparation in which settling or sedimentation may be a problem may be aided by addition of the aggregates, it having been found that their stable dispersion- and gel-forming advantages are also applicable to more complex mixtures. Elimination of settling is particularly possible in preparations, such as suspensions, lotions, pastes, etc., where gels of the aggregates may be used owing to the higher content of aggregates which gels may have.

As indicated, the aggregates are suitable for use in pharmaceutical product forms which contain an ingredient in the solid state; that is to say, a solid ingredient other than the aggregates. Where their presence is not harmful, they may be of benefit to non-solid-containing liquid preparations such as solutions, emulsions, liquid extracts, tinctures, elixers, syrups or other liquid mixtures. While the aggregates are normally in a solid state, whether dry or suspended in a liquid such as water, they are capable of existing in a form about which some question may arise as to whether or not they are in the solid state; this is the form brought about when aggregate particles of extremely fine size, say less than 1 micron and particularly less than 0.5 micron, are dispersed in water; under these conditions the aggregates may form what are called gel particles, comprising particles so swollen that a question may arise as to whether they are in a solid or a liquid state. For the purposes of this invention, it is to be understood that the terms "aggregates," or "solid aggregates," or "solid particles," or "finely divided solid form" are intended to include these gel particles of aggregates as well as the aggregates of larger size.

With the exceptions noted, the methods of formulating the preparations may, in general, be those employed for conventional products. A convenient and effective method, in some cases, is to start with the aggregates in gel or dispersion form and to blend the other ingredients therein; if a dry powder is desired, the resulting blend may be subjected to, say, spray drying.

The invention may be illustrated by the following examples.

*Example 1*

Cellulose crystallite aggregates were prepared by hydrolyzing Ketchikan sulfite wood pulp with a 0.5% by weight aqueous solution of HCl for 1 hour at 250° F., there being obtained a material having an average level-off D.P. of 220, a purity above 96% and less than 200 p.p.m. ether extractable components. This material was dried in a vacuum oven at 158° F. to a moisture content of about 4 to 5% by weight. It was then screened, and the fraction passing through a 325-mesh sieve (44 microns and less) was taken.

Two cc. of fish liver oil were triturated with 25 grams of the powdered aggregates to form an apparently dry, freely flowing powdered mixture. The amount of fish liver oil used provided 31,250 I.U. (International Units) of vitamin D and 312,500 I.U. of vitamin A. The white powdery mixture was then formed into tablets by means of a suitable mold and a hand-operated press. About 0.4 gram of powdered mixture was used for each tablet, the latter having a diameter of 3/8 inch and a thickness of 3/16 inch and being well formed with sharp edges. It was estimated that about 1500 p.s.i. pressure was exerted in forming the tablets. Each tablet had a vitamin A content of 4660 I.U. and a vitamin D content of 466 I.U. Two of the tablets were placed in a small glass bottle, which was then stoppered and shaken by hand for 5 minutes, and then two conventional aspirin tablets were similarly treated; it was apparent that the aspirin tablets formed a great deal of dust and the tablets themselves were very considerably eroded, whereas the aggregates-containing tablets gave off very little dust, far less than the aspirin tablets, and showed much less erosion. Then another pair of each tablet were placed side-by-side in a small amount of water and allowed to stand. The aspirin tablet immediately began to flake and within one minute appeared to have completely lost its shape. The aggregates-containing tablet began to swell slowly and in about a minute's time appeared to have twice its original thickness; it did not flake by itself but when gently touched with a spatula, it fell apart, after which tiny droplets of oil were visible on the surface of the water.

It was apparent from these tests that the aggregates are capable of forming erosion-resistant tablets that have good water-dispersible properties.

*Example 2*

Conventional Whitfield ointment was prepared having the ingredients listed under A in the following table:

| | A | B | C | D |
|---|---|---|---|---|
| Benzoic acid_____g__ | 12 | 6 | 12 | 6 |
| Salicylic acid_____g__ | 6 | 3 | 6 | 3 |
| Wool fat_____g__ | 5 | 2.5 | | |
| White petrolatum_____g__ | 77 | 38.5 | 77 | 38.5 |
| Crystallite aggregates_____g__ | | 5 | 5 | 12.5 |

The ingredients of A were blended on a glass plate with a spatula to give a white glistening ointment mix. Then modification B was made by taking half of sample A and blending with it approximately 5 grams of crystallite aggregates, as prepared in Example 1, to produce a less greasy, somewhat thicker ointment. Modification C was prepared in the same way as sample A except that the wool fat was omitted in favor of the crystallite aggregates; this ointment was whiter than A and B and considerably less greasy than either but still unctuous. Modification D was prepared by taking half of sample C and gradually blending in crystallite aggregates until the mixture became crumbly and resembled a dough rather than an ointment. The total addition of aggregates was 12.5 g., and at this point further addition of the aggregates was stopped and the mix was worked well with a spatula until it again became cohesive. The mix was much whiter than any of the other preparations and clung well to the skin when spread thereover; it had good unctuousness without being greasy. Samples C and D, particularly the latter, had much less tendency to soak through a bandage than samples A and B.

*Example 3*

A conventional iodine ointment, sample E, was made up having the following formula:

| | E | F |
|---|---|---|
| Iodine_____g__ | 2.5 | 2.5 |
| Paraffin_____g__ | 2.5 | |
| Oleic acid_____g__ | 10 | 10 |
| Petrolatum_____g__ | 35.5 | 25.5 |
| Crystallite aggregates_____g__ | | 2.5 |

The iodine was first dissolved in the oleic acid at 65 to 70° C. Then the paraffin was added and the mixture was heated to dissolve the same, after which the petrolatum was blended in and the mixture stirred until the mass congealed. After working on a glass plate with a spatula, a brown smooth ointment resulted. Sample F was prepared in the same way as E except that crystallite aggregates, as prepared in Example 1, were used in lieu of the paraffin; the product so made was in the form of a black smooth ointment which was noticeably less greasy than sample E.

*Example 4*

Two calamine preparations were made up, one a conventional material, identified as G, and the other, identified as H, very similar to it but additionally containing crystallite aggregates as used in Example 1. The compositions are as follows:

| | G | H |
|---|---|---|
| Calamine_____g__ | 5 | 5 |
| Zinc oxide_____g__ | 5 | 5 |
| Glycerine_____g__ | 5 | 5 |
| Water_____g__ | 85 | 80 |
| Crystallite aggregates_____g__ | | 5 |

Both samples comprised aqueous suspensions; when allowed to stand, a supernatant liquid collected in each. In sample G, the supernatant was foamy, whereas in H it was not. After shaking each sample, it was noted that in G the solids settled much more quickly than in H. In appearance, H appeared to be superior. No difference was observed when portions of both samples were applied to the skin.

*Example 5*

A medicinal mineral oil preparation was formed by mixing 5 tablespoons of the oil with 25 grams of crystallite aggregates of the kind used in Example 1, there being formed an apparently dry, free flowing powdery mixture. When poured into the hand, the mixture gave no evidence either by touch or appearance of the presence of the oil; rather, it had the feel of an impalpable powder. The mixture was easily compressed with a spatula and did not wet absorbent paper.

By "apparently dry," as used in this example and elsewhere, is meant not the absence of liquid but, rather, that it has been adsorbed and/or absorbed, i.e., sorbed, on and in the aggregates.

*Example 6*

A standard pentobarbital sodium formulation was made up, using starch and lactose as binding agents, and also an aggregates-containing formulation which omitted those conventional binders.

|  |  | Standard (grey) | Aggregates formula (pink) |
|---|---|---|---|
| Starch | grain | 1 |  |
| Aggregates | do |  | 1 |
| Pentobarbital sodium | do | 2 | 2 |
| Kaolin | do | 1 | 1 |
| Stearic acid | do | 0.004 | 0.004 |
| Lactose | do | 0.004 |  |

Granulations were made conventionally, dried, and tablets pressed in a hand machine. The disintegration rate in distilled water of both formulations was then measured. Single tablets were placed in the dry side arm of Warburg flasks containing 5 ml. distilled water. The flasks were equilibrated at 37° C. for 25 minutes, following which the tablets were tripped into the water and shaking started at a constant rate. Both kinds of tablets were run at the same time, and observations were made at regular intervals to determine the progress of tablet disintegration. The average time of total disintegration of three of each type of tablet was tabulated. Results:

Standard (grey) _____ 39 minutes.
Aggregates (pink) _____ More than 75 minutes.

The standard tablet disintegrated progressively with time, and after shaking in the water, left a uniform suspension of white granules. The aggregates preparation also disintegrated progressively, giving a suspension of granules which were somewhat larger than those of the standard; a residue equal to about ¼ of the tablet was still present after 24 hours. It was apparent that the aggregates delayed the disintegration of the tablets for a time approximately twice that of the conventional tablets, a useful result obtained simply by replacing the starch and lactose components by the aggregates.

The substitution of water-insoluble and/or organic solvent-insoluble aggregates derivatives having the properties and characteristics described hereinbefore, such as, for example, carboxymethyl, hydroxypropyl or acetate derivatives, for the cellulose crystallite aggregates in the foregoing examples forms preparations or compositions having substantially similar properties as those described in the specific examples. For example, Whitfield ointment prepared as described in Example 2 substituting mechanically disintegrated aggregates derivatives having a D.S. of not more than 0.1 to about 0.2 for the crystallite aggregates, is of approximtaely the same appearance but may have a slightly smoother feel when rubbed between the fingers. Thus, the same amounts of a sodium carboxymethyl or a hydroxypropyl derivative of the aggregates having a D.S. of 0.1 form ointment with the same white glistening appearance. Where the same derivatives have a D.S. of about 0.3, the ointment has a more translucent appearance and where the D.S. is about 0.4, the ointment has an appearance approaching that of white petrolatum. These preparations retain the unctuous and non-greasy characteristics as described in the foregoing example. Tablets formed as described in Example 6 have the same white appearance, however, the rate of disintegration of the tablet may be controlled by utilizing derivatives of different degrees of substitution (D.S.). The rate of disintegration of tablets formed with a derivative, for example, with hydroxypropyl derivatives, will vary directly with the D.S. of the specific derivative employed.

It is apparent from the foregoing description that the present invention provides improved pharmaceutical compositions including cellulose crystallite aggregates and at least one active pharmaceutical substance or ingredient in a sufficient amount and in an available form so as to impart its characteristic therapeutic effect or property to the composition.

This application is a continuation-in-part of application Serial No. 65,303, filed October 27, 1960, which was a continuation-in-part of application Serial No. 836,320, filed August 27, 1959, both of which are now abandoned.

Although the invention has been described in connection with specific embodiments of the same, it will be understood that it is capable of obvious variations without departing from its scope.

I claim:

1. A pharmaceutical composition comprising a substantially pure substance selected from the group consisting of cellulose crystallite aggregates, water-insoluble derivatives of cellulose crystallite aggregates having a D.S. of at least 0.01 and organic solvent-insoluble derivatives of cellulose crystallite aggregates having a D.S. of at least 0.01, the cellulose crystallite aggregates having an average level-off D.P., the substance containing not more than about 500 p.p.m. of ether-extractable components, and at least one pharmaceutical ingredient compatible with the aggregates and present in an available form and in an amount sufficient to impart its characteristic therapeutic property to the composition.

2. A pharmaceutical composition as defined in claim 1 wherein the cellulose crystallite aggregates have an average level-off D.P. of from 15 to 375 and at least 1% of the substance, by weight has a particle size not exceeding 1 micron.

3. A pharmaceutical composition as defined in claim 1 wherein the substance is cellulose crystallite aggregates having an average level-off D.P. of from 15 to 375 and containing not over 200 p.p.m. of ether extractable components.

4. A pharmaceutical composition as defined in claim 2 wherein the compoistion is in a free-flowing apparently dry powder form.

5. A pharmaceutical composition as defined in claim 2 wherein the composition is in a substantially dry, solid compressed form.

6. A pharmaceutical composition as defined in claim 2 wherein the composition includes water and is in a pourable liquid form, the substance being colloidally dispersed in the water.

7. A pharmaceutical composition as defined in claim 2 wherein the composition includes water and is in a gel form, the substance being colloidally dispersed in the water.

8. A pharmaceutical composition as defined in claim 2 wherein the composition includes an oleaginous material.

9. A pharmaceutical composition as defined in claim 2 wherein the composition includes water and an oleaginous material.

References Cited in the file of this patent

UNITED STATES PATENTS

| | | |
|---|---|---|
| 2,978,446 | Battista et al. | Apr. 4, 1961 |
| 3,012,914 | Battista et al. | Dec. 12, 1961 |
| 3,023,104 | Battista | Feb. 27, 1962 |
| 3,052,593 | Battista | Sept. 4, 1962 |
| 3,067,037 | Herald et al. | Dec. 4, 1962 |